US007197710B2

(12) United States Patent
Faraday et al.

(10) Patent No.: US 7,197,710 B2
(45) Date of Patent: *Mar. 27, 2007

(54) ANIMATION ON OBJECT USER INTERFACE

(75) Inventors: Peter Faraday, Bellevue, WA (US);
Steven Geffner, Bothell, WA (US);
Elaine Law, Redmond, WA (US);
Imran Qureshi, Sunnyvale, CA (US)

(73) Assignee: Microsoft Corp., Redmond, WA (US)

( * ) Notice: Subject to any disclaimer, the term of this patent is extended or adjusted under 35 U.S.C. 154(b) by 112 days.

This patent is subject to a terminal disclaimer.

(21) Appl. No.: 10/975,747

(22) Filed: Oct. 28, 2004

(65) Prior Publication Data

US 2005/0091573 A1    Apr. 28, 2005

Related U.S. Application Data

(63) Continuation of application No. 09/832,255, filed on Apr. 9, 2001, now Pat. No. 6,957,389.

(51) Int. Cl.
G11B 27/00  (2006.01)
(52) U.S. Cl. .................... 715/723; 715/500.1; 345/474
(58) Field of Classification Search ............. 715/500.1, 715/723; 345/474
See application file for complete search history.

(56) References Cited

U.S. PATENT DOCUMENTS

| 5,867,175 A | * | 2/1999 | Katzenberger et al. ..... 345/473 |
| 5,917,730 A | * | 6/1999 | Rittie et al. ..................... 703/6 |
| 5,982,350 A | * | 11/1999 | Hekmatpour et al. ....... 345/629 |
| 5,990,878 A | * | 11/1999 | Ikeda et al. ............... 715/500.1 |
| 6,577,315 B1 | * | 6/2003 | Kroitor ........................ 345/473 |
| 6,957,389 B2 | * | 10/2005 | Faraday et al. ............. 715/731 |

OTHER PUBLICATIONS

Koved, Larry, et al, "GROOP: An Object-Oriented Toolkit for Animated 3D Graphics", ACM SIGPLAN NOtices, vol.28, Issue 10, Oct. 1993, pp. 309-325.*
Gobbetti, Enrico, et al., "An Integrated Environment to Visually Construct 3D Animations", Proceedings of the 22nd Annual Conference on Computer Graphics and Interactive Techniques, Sep. 1995, pp. 395-398.*

* cited by examiner

*Primary Examiner*—William Bashore
*Assistant Examiner*—L. Ries
(74) *Attorney, Agent, or Firm*—Lyon & Harr, LLP; Katrina A. Lyon

(57) ABSTRACT

A system and method for graphically showing the animation order of animated elements in a presentation program or other software. The invention consists of a User Interface (UI) widget which shows the order of the animation in the presentation. This UI employs an animation On Object User Interface (OOUI), or animation tag, that is preferably a rectangular control that encloses a number, and labels the order in which objects are animated. Each animation OOUI or animation tag is associated with an object on a display during creation and editing. The animation OOUI or tag is preferably placed in close proximity to the object it is associated with, rather than in a separate window or dialog box, and is hence termed 'On Object'. The animation tag is active and responds to computer input device selection actions. Each animation OOUI is typically associated with an animation list.

35 Claims, 7 Drawing Sheets

600

700  702

ANIMATION ON OBJECT USER INTERFACE

This is a continuation of prior application Ser. No. 09/832,255 filed Aug. 9, 2001 now U.S. Pat. No. 6,957,389.

BACKGROUND OF THE INVENTION

1. Technical Field

The invention is related to a system and method of customizing a software program, in this case a presentation program, to provide a user with a graphical representation of the order of elements in an animation sequence on a display device. The invention could, however, be equally well applied to other software applications, such as, for example, Internet web-site authoring software, electronic mail programs, and drawing and flowcharting software.

2. Background Art

Electronic presentations often use computer graphics to enhance the presented material thereby giving the audience an immediate grasp of the information presented. Common examples of such graphics include bar charts, pie charts, text animation and organizational charts. Additionally, many electronic presentations use animation, the adding of a special visual or sound effect to text or an object, to enhance these graphics.

Animation is a powerful way to attract and sequence users' attention in an electronic presentation. It is possible to animate text, graphics, diagrams, charts, and other objects to focus an audience on important points, control the flow of information, and add interest to a presentation. Animation in a presentation occurs when objects or animation effects on these objects in a slide are scheduled by the user to appear in a prescribed sequence. When the user then inputs a command for one or more of the objects or effects to appear, they appear in a certain order. For example, a user can have a text bullet on a slide fly into the slide from the left, one word at a time, or hear the sound of applause when a picture is uncovered.

Animation is a temporally continuous phenomenon, but is typically programmed in terms of a discrete sequence of changes. One of the problems facing an author producing an animated presentation is that it can be difficult to know which elements in the presentation they have animated, and in which sequence the animation will replay.

Existing software that employs animation shows the animation sequence order in a list. This makes it difficult to reconcile the order in which elements are going to animate because the names of elements can be confusing or unfamiliar (such as, for example, the elements can be file names). Mental effort is required to match the list to what is being shown in the animation editor, where the animation is composed for later viewing by an audience. Users have complained that they cannot tell which objects on the slides are animated, nor can they determine the sequence of animation effects.

Therefore, what is needed is a system and method for representing or displaying the order of objects and effects in an animation sequence that makes it simple for a user to determine which elements are animated and the order in which they are animated.

SUMMARY

The system and method according to the present invention solves the problem of displaying a confusing animation sequence during animation creation and editing. The sequence of animation is graphically shown in the editing window of an electronic presentation or other software that employs the use of animation, in close proximity to the animated elements or objects. As used herein, the term "object" is meant to refer to any item displayed by an application program module for manipulation by the user. For example, within a presentation program, word processing program, electronic spreadsheet or desktop publication program module, an object may comprise a string of text, a table or plurality of cells, a graphic, an image, a video clip, and so on. The invention gives a user instant feedback on animation events while they are animating their presentation or other software. This allows the user to debug the animation events in real time when using an animation editor or viewer to create the animation events.

More particularly, the invention consists of a User Interface (UI) widget which shows the order of the animation in the presentation. This UI employs an animation On Object User Interface (OOUI), or animation tag, that is preferably a rectangular control that encloses a number, and labels the order in which objects are animated. Alternately the OOUI could be an icon or symbol. For purposes of this writing, the terms animation OOUI and animation tag will be used interchangeably. Each animation OOUI or animation tag is associated with an object on a display that typically displays the various objects or elements of the presentation during creation and editing. The animation OOUI or tag is preferably placed in close proximity to the object it is associated with, rather than in a separate window or dialog box, and is hence termed 'On Object'. The enclosed number represents the number in a sequence of mouse clicks or other computer input device selection actions which causes an animation effect on an associated object or element. Such animation effects include having an object spin, fade in, fade out, fly across the screen, split, descend, ascend, expand, change color, change text characteristics, or be associated with sound or video, to name a few. The animation tag makes it much easier for the user to reconcile the order in which objects are animated because of the proximity of the tag to the referent object. The animation tag is active and responds to computer input device selection actions.

An object may have zero, one or several animation tags or animation OOUIs associated with it in the animation creation and editing portion of the application software. However, when the final animation product, such as an electronic presentation, is viewed by an audience the animation tags are not visible.

Each animation OOUI is typically associated with an animation list, although it does not have to be. The animation list is a list of animations in sequence order. Each item in the list represents an individual animation effect. Each effect is preferably associated with a number that represents its order in a sequence of mouse clicks or other computer input device selection actions. The numbers in the animation OOUI correspond to the numbers in this list. When a user is creating or editing an object for animation and selects an item or items in the animation, the corresponding animation tag(s) in the editor which displays the objects and associated animation tags are also selected and highlighted. When an item or items in the animation list are deselected, the corresponding animation tag(s) in the editor are deselected (and unhighlighted). Similarly, when one or more animation tag(s) are selected or deselected in the editor, the corresponding entries in the animation list are selected or deselected and highlighted or unhighlighted.

The animation OOUI may change when it is selected. For instance, when an animation OOUI is selected with a mouse cursor, or there is a mouse cursor hovering above the animation OOUI, it may change color to indicate it is selected or provide pop up windows with additional information about the object associated with the animation tag.

If the object has multiple effects on the same click in the animation sequence then only a single animation OOUI is shown. However, if there are multiple animation effects that appear at different times for a particular object, multiple animation OOUIs are provided. If the user adds more effects than there is space to show at the side of the element then an ellipsis is shown behind the number on the animation tag to indicate that more sequences exist for that item.

In one embodiment of the present invention, animation tags are preferably rendered in number order along the left vertical edge of an imaginary bounding box of the associated object. This bounding box is typically squarely located on the display area and sized so to closely enclose the associated object. In another embodiment the bounding box may also be defined by the selection handles for the object. This implementation ensures there is no interference with the selection handles which would interfere with editing the object. If there are more animation OOUIs than will fit along the left edge, the last displayable animation OOUI (the last animation OOUI there is place to display) is appended with an ellipsis to denote that there are animation OOUIs which are not displayed. When several objects overlap, the animation OOUI elements for the currently-selected object preferably come to the foreground. If no object is selected, the animation OOUI for the front-most object comes to the foreground.

The number of animation OOUIs that will fit along the edge of an associated object is preferably determined by the height of the object. If the user expands the size of the slide in the editor then the amount of space to show the animation OOUI is recalculated. If more space is available more of the animation sequence will be shown. Hence, when the size of the slide and therefore the object showing one or more animation OOUIs is expanded, more animation OOUIs can be displayed along the object than when the object is smaller. In the alternative, the animation OOUIs can be scaled down in size to allow more of them to be displayed, although care must be taken to ensure that the animation OOUIs are still big enough to be legible. Another embodiment shows multiple columns of animation OOUIs when two objects are shown in the same general space in the display.

The user of the system and method according to the present invention can use various mouse and keyboard short cut keys to activate the animation OOUI. For example, 'shift' and 'ctrl' select keyboard keys can be used to make contiguous and non-contiguous multiple selections in conjunction with a mouse. The invention also allows the user to combine two animation effects together and then to separate them again. Combining the two animation effects together will result in the selected objects or events occurring at the same time. Separating the two effects will cause the two animation events to occur at different times. Furthermore, the user can change the order of animation effects by selecting an animation effect in the animation list and dragging it up or down the list with a mouse cursor or other computer input device. When the user changes the order of the animation effects by doing this, the numbers associated with the effects in the animation list and the numbers associated with the animation tags change to indicate the changed order of the animation effects associated with the corresponding objects. The user can also delete an animation effect from the animation list and the corresponding animation OOUI will be deleted and the other animation OOUIs will be renumbered accordingly to reflect their new animation order in the animation sequence. Likewise, if the user deletes an animation OOUI, the corresponding effect in the animation list will be deleted, and both the animation OOUIs and the effects in the animation list will be renumbered.

In another embodiment, the animation OOUI control has a different shape than a rectangle, such as, for example, a hand. This hand-shaped animation tag represents interactivity between two animation objects.

In yet an additional embodiment of the invention, the user can place a computer data input device cursor, such as a mouse cursor, over the animation OOUI and a window of additional information will pop up. This pop-up window if typically referred to as a "tool tip". This tool tip or pop-up window may provide a list of the elements associated with the animation OOUI and a name. Or a mini-version of what items in the animation list are associated with the animation OOUI might show up in the pop up window. Or the tool tip window could be interactive and allow the user to set up parameters for the animation associated with a specific object.

DESCRIPTION OF THE DRAWINGS

The specific features, aspects, and advantages of the present invention will become better understood with regard to the following description, appended claims and accompanying drawings where:

DETAILED DESCRIPTION OF THE PREFERRED EMBODIMENTS

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Exemplary Operating Environment

Figure 1:
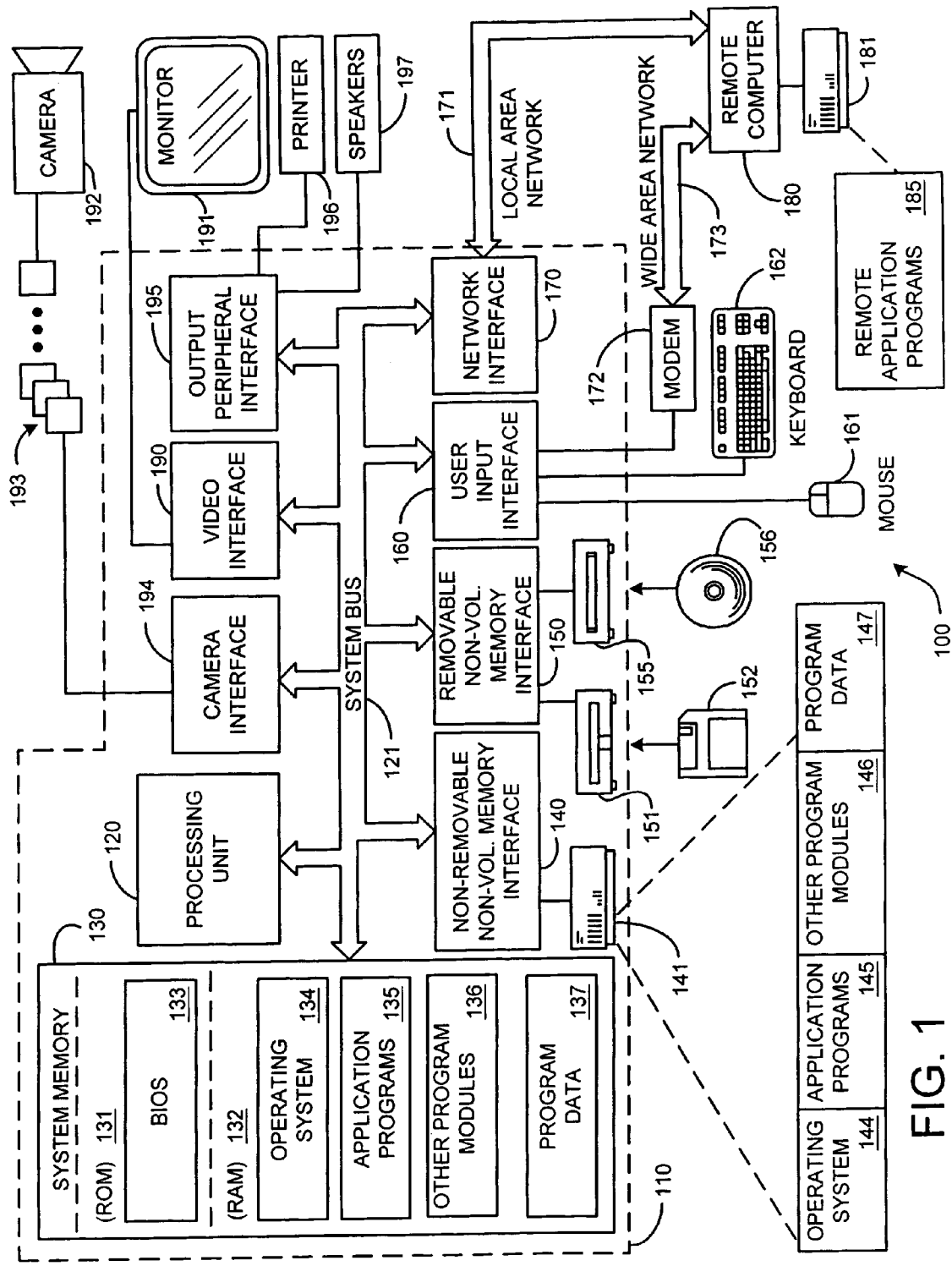
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile, magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

System Overview

In the system and method according to the present invention, the animation order of animated objects is graphically shown in close proximity to these objects in the editing window of software that employs the use of animation. The invention gives a user instant feedback on animation events while they are creating the animations. This allows the user to debug the animation events in real time.

The invention consists of a User Interface (UI) widget which shows the order of the animation in the presentation. This UI employs an animation On Object User Interface (OOUI), or animation tag, that provides the order in which objects are animated, and that is preferably a rectangular control, icon or symbol that encloses a number. This number represents the number in a sequence of mouse clicks (or other input device selection actions) which causes an animation effect on an associated object. Such an animation effect includes, for example, having an object spin, fade in, fade out, fly across the screen, split, descend, ascend, expand, change color, change text characteristics, or be associated with sound or video. Of course, many other animation effects are possible. The UI is termed 'On Object' because the control is placed next to the element on the slide itself, rather than in a separate window or dialog box. This makes it much easier for the user to reconcile which element is animated, and in what order it is animated. The animation OOUI (or animation tag) is active and responds to computer input device selection actions such as mouse clicks and mouse-over events.

An object may have zero, one or several animation OOUIs associated with it in the animation creation and editing portion of the application software. However, when the final animation product, such as an electronic presentation, is viewed by an audience the animation OOUIs are not visible.

Figure 2:
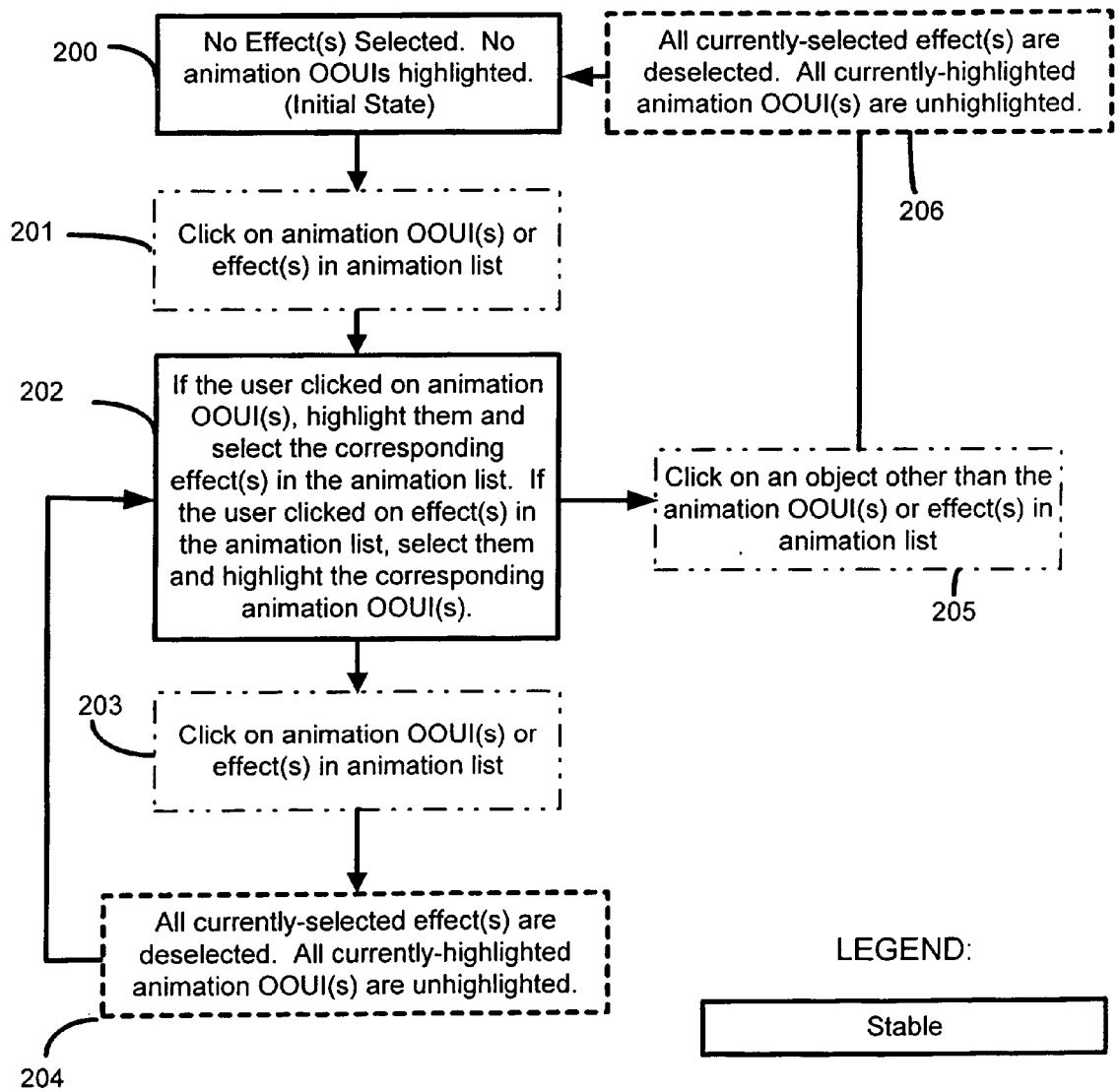
FIG. 2 is a state diagram for the animation OOUI and the effects of selection and deselection of the animation OOUI according to the present invention.

Each animation OOUI is typically associated with an animation list, although it does not have to be. The animation list is a list of animations in sequence order. Each item in the list represents an individual animation effect. Each effect is preferably associated with a number that represents its order in a sequence of mouse clicks or other computer input device selection actions. The numbers in the animation OOUI correspond to the numbers in this animation list. FIG. 2 provides a state diagram for the animation OOUI and the effects of its selection and deselection. The initial state of the animation OOUIs and items in the animation list are that they are unselected, as shown in process action 200. As shown in process actions 201 and 202, when an item or items in the animation list are selected, the corresponding animation OOUI(s) in the editor are also selected. Further, when an item or items in the animation list that were previously selected are deselected, as shown in process actions 203 and 204, the corresponding animation OOUI(s) in the editor are deselected. Similarly, when one or more animation OOUI(s) are selected or deselected in the editor, the corresponding entries in the animation list are selected or deselected (process actions 203 and 204). When the user clicks elsewhere than on the animation OOUIs or the animation list elements, all currently selected effects and currently selected or highlighted OOUIs are deselected, as shown in process actions 205 and 206.

The animation OOUI or animation tag may change when it is selected. For instance, when an animation OOUI is selected with a mouse cursor or there is a mouse cursor hovering above the animation tag, it may change color to indicate it is selected, or a pop-up window may appear with additional information about the object associated with the animation tag. If an object has multiple animation effects on the same click in the sequence then only a single animation OOUI is shown. However, if there are multiple animation effects that appear at different times in the animation sequence for a particular object, multiple animation OOUIs are provided. If the user adds more effects than there is space to show at the side of the element then an ellipsis is shown to indicate that there are more animation tags that there is not room to display. For example, the second and third animation effects may be contained within an animation tag labeled with 4. This use of the ellipsis prevents the animation tag from overlapping with other animation tags or elements in the presentation.

In one embodiment of the present invention, animation OOUIs are preferably rendered in number order along the left vertical edge of an imaginary bounding box enclosing the associated object. This bounding box is typically located on the display area with its edges parallel to the display area and is sized so as to closely enclose the associated object. The bounding box may also be defined by the selection handles of the object. This will prevent overlap which could lead to problems editing the object. If there are more animation OOUIs than will fit along the left edge, the last displayable animation OOUI (the last animation OOUI there is room to display) is appended with an ellipsis to denote that there are animation OOUIs which are not displayed. When several objects overlap, the animation OOUIs for the currently-selected object preferably come to the foreground. If no object is selected, the animation OOUI for the front-most object comes to the foreground of the display.

The number of animation OOUIs that will fit along the edge of an associated object is preferably determined by the height of the object. If the user expands the size of the slide in the editor then the amount of space to show the OOUI is recalculated. If more space is available more of the animation sequence will be shown. Hence, when the size of the slide and therefore the object showing one or more OOUIs is expanded, more OOUIs can be displayed along the object than when the object is smaller. In the alternative, the OOUIs can be scaled down in size, although care must be taken to ensure that the OOUIs are still big enough to be legible. Another embodiment shows multiple columns of OOUIs when two objects are shown in the same general space in the display.

The user of the system and method according to the present invention can use various keyboard and mouse short cut keys to activate the animation OOUI. For example, to select multiple objects the user might use the [CTRL] key and the mouse to select certain objects. Or the user could use the [SHFT] key and mouse to select a sequence of objects.

The invention also allows the user to combine two animation effects together and then to separate them again. Combining the two animation effects together will result in the selected objects or events occurring at the same time. Separating the two effects will cause the two animation effects to occur at different times. In one embodiment of the present invention the animation list can be used to set the logical relationships between animation effects. A context menu can be used to set the relationship from requiring a click to starting 'with previous' or 'after previous' animation effect. Selecting a 'with previous' option will cause the animation sequence of an element to begin at the same time as the previous item on an animation list (that is, one mouse click will execute two animation effects). Selecting 'after previous' will cause the animation sequence to begin immediately after the previous item in the list is finished playing (that is, no additional click is required to make the next animation sequence start. OOUIs will be combined if the animation effects on an object now start on the same mouse click or other input device selection action. OOUIs will be separated if the context menu is used to set the relationship from 'with previous' or 'after previous' to start with a new mouse click or other input device selection action. Alternately, a user can set the animation order by using a spinner control (a graphical control that allows the user to increment or decrement a value using a mouse instead of a keyboard) associated with a pop up window which appears when the user selects the OOUI.

Furthermore, the user can change the order of animation effects by selecting an animation effect in the animation list and dragging it up or down the list with a mouse cursor or other computer input device. When the user changes the order of the animation effects by doing this, the numbers associated with the effects in the animation list and the numbers associated with the animation tags change to indicate the changed order of the animation effect associated with the corresponding objects. The user can also delete an animation effect from the animation list and the corresponding animation OOUI will be deleted and the other animation OOUIs will be renumbered accordingly to reflect their animation order in the animation sequence. Likewise, if the user deletes an animation OOUI, the corresponding effect in the animation list will be deleted, and both the animation OOUIs and the effects in the animation list will be renumbered.

In another embodiment, the animation OOUI has a different shape than a rectangle, such as, for example, a hand. This hand-shaped animation tag represents interactivity between two objects. For instance, given a rectangular object and a circular object with a hand-shaped animation OOUI, when a user clicks on the rectangular object, the circular object might grow. Hence, the hand-shaped animation tag indicates an interactivity between the two objects associated with the hand-shaped animation OOUI.

In yet another embodiment of the invention, the user can place a computer data input device cursor, such as a mouse cursor, over the animation OOUI and a window of additional information will pop up. This pop-up window if typically referred to as a "tool tip". This tool tip or pop-up window may provide a list of the elements associated with the animation OOUI and a name. Or a mini-version of what items in the animation list are associated with the animation OOUI might show up in the pop-up window. Or the tool tip window could be interactive and allow the user to set up parameters for the animation effect associated with a specific object.

WORKING EXAMPLES

The following paragraphs and figures provide working examples of the system and process according to the present invention.

Figure 3:
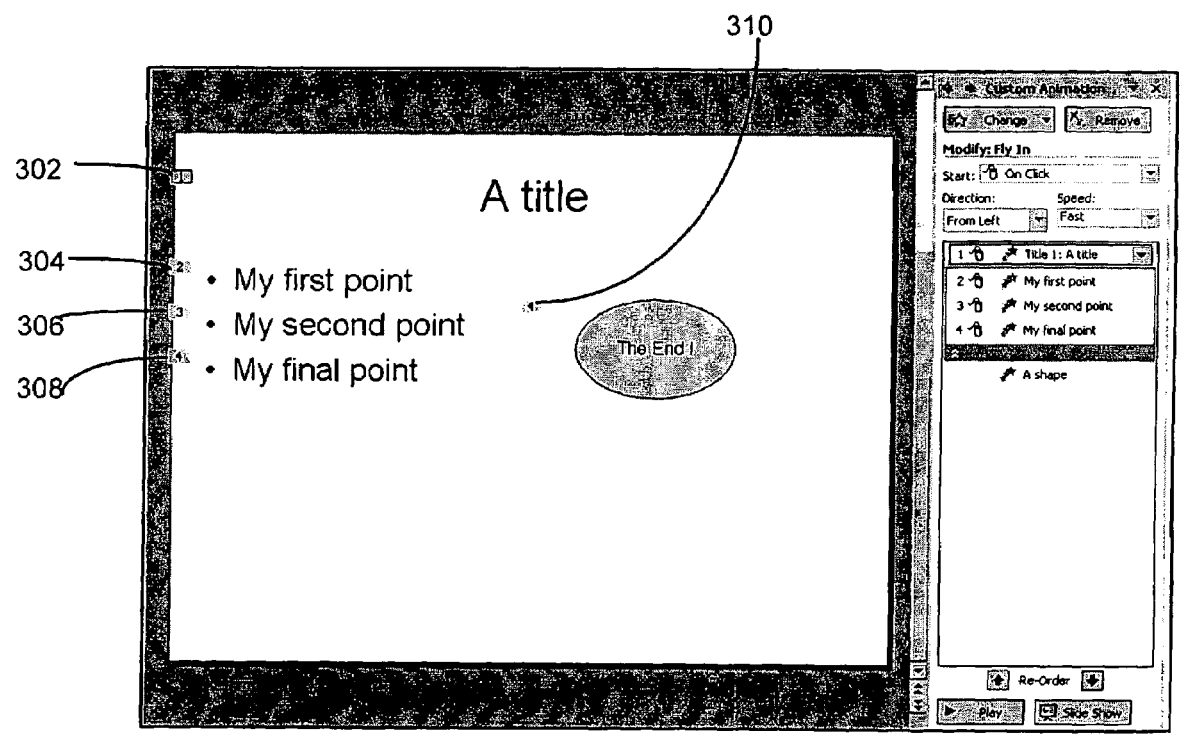
FIG. 3 shows an example of the animation OOUIs that show the ordering of animation effects in a slide.

FIG. 3 depicts how the animation sequence is displayed as a numbered sequence of 'On Object' User Interface (OOUI) widgets over the presentation. Each element in the presentation to which the user has applied animation is shown with a small animation OOUI or animation tag (302 through 310) next to it containing a number. The number gives the sequence order in which the animation will play. This number also corresponds to the sequence in the animation list that shows on which mouse click an animation effect will take place. For example, in FIG. 3, the Title is set to animate first, so it is shown with a '1' next to it. The bullet points of the presentation then animate one at a time, so each has a number in ascending sequence. Finally the oval will animate at the same time as the last bullet, since both are ordered as '4', as indicated by the '4' in the animation tag associated with the oval.

The animation OOUI is also used to show animation order for other types of media in the presentation, such as charts.

Figure 4:
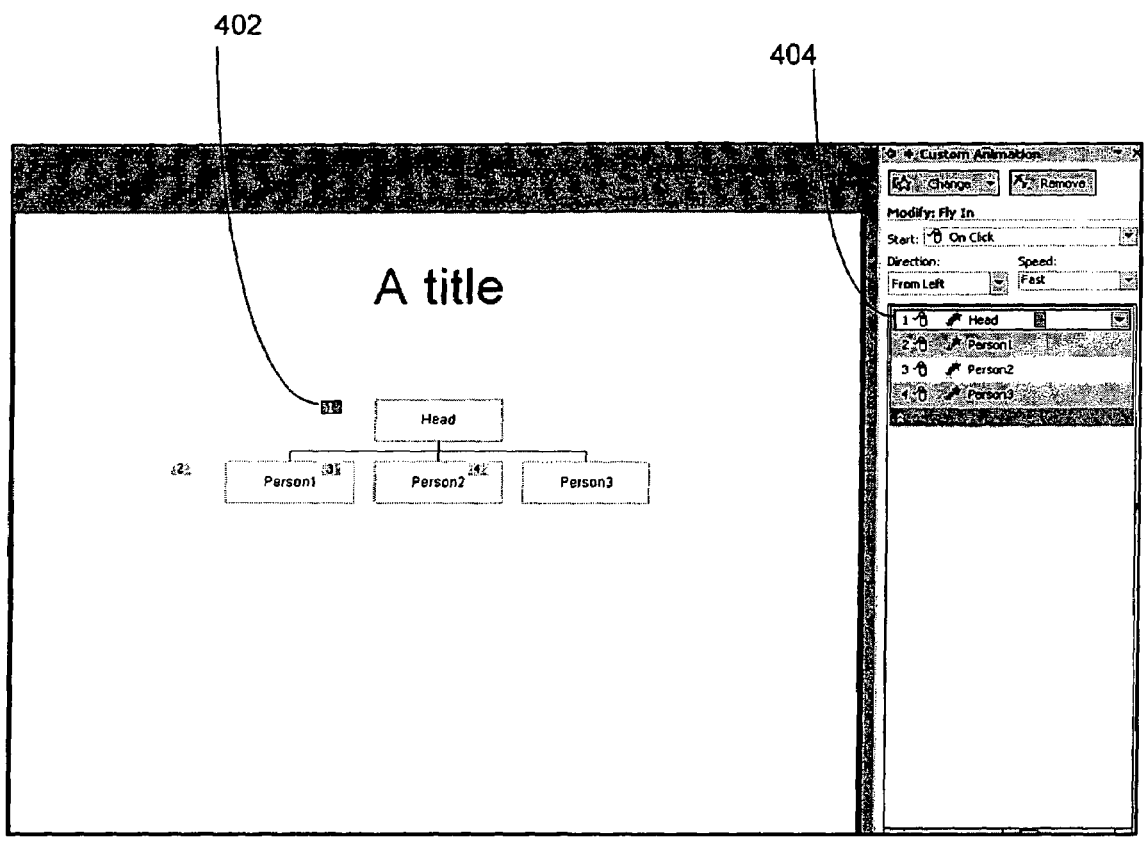
FIG. 4 is a screen image showing an exemplary implementation of a working example according to the present invention.

For instance, if a chart is set to animate, the animation OOUI or tag is shown next to each part of the chart, as shown in FIG. 4. Again, the animation OOUI makes it easy for the user to see in which order the chart will animate. The animation OOUIs show the sequence in which the chart will animate: Head will appear first, then 'Person1', 'Person2', and 'Person3'. In FIG. 4, the animation OOUI for 'Head' 402 is selected (indicated in this case by a different shade), so the entry corresponding to the Head OOUI in the list 404 is also highlighted (also indicated by a different shade).

Again, the details of each of the animations are shown in the list on the right of the screenshot in FIG. 4. When the user selects an animation OOUI, it highlights the corresponding effects in the animation list. This functionality makes it easy for the user to reference from the element to which they have applied their animation effect to the more detailed animation list that shows the type of the animation and allows the user to manipulate it. In FIG. 4, the user has selected the animation OOUI 402 next to the Head element. This highlights the entry in the animation list 404 which the user can then manipulate (i.e., re-order this animation or change the type of animation effect).

Figure 5:
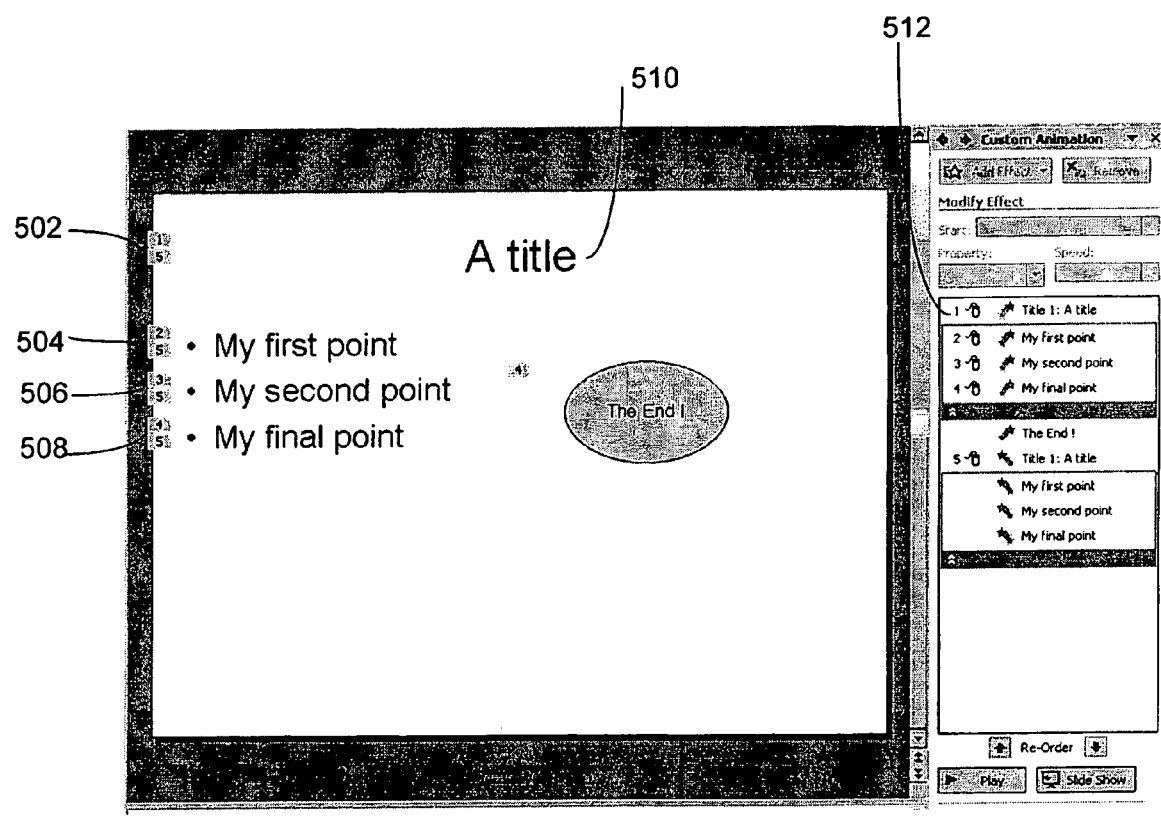
FIG. 5 is a screen image showing an exemplary implementation of a working example of the present invention wherein more complex sequences of animation elements are shown as vertical columns.

As shown in FIG. 5, more complex sequences of animation are shown as vertical columns (502, 504, 506 and 508) of animation OOUIs. In this example, Title 510 will fly in to the slide at the beginning of the presentation, and fly out again at the end.

The animation OOUI is placed on the left side of the element so that it does not obscure the bullet text, and so that the textbox which encloses the text does not render over the animation OOUI when selected. In FIG. 5, the user has added additional animation effects to the title and the bullet points in the presentation. These are all set to animate last in the sequence. As the user adds further effects to their presentation, the animation OOUIs are shown stacking to the side of the element using a vertical layout algorithm. In FIG. 5, animation effects will occur to the title on the first and fifth mouse clicks. If the animation OOUI with the '1' in it is selected by the user, then the corresponding animation effect with the '1' adjacent to it will be highlighted in the animation list 512.

Figure 6:
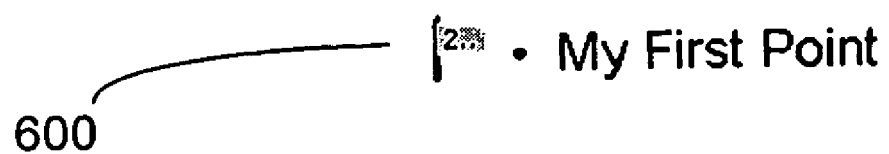
FIG. 6 is a portion of a screen image showing an exemplary implementation of the present invention wherein an ellipsis is used to show the user that additional animations exist which cannot be displayed due to a lack of space.

If the element has multiple effects on the same click (or other computer input device selection action) in the sequence then only a single animation OOUI or tag is shown. If the user adds more animation effects than there is space to show at the side of the element then an ellipsis is shown to indicate that there are more animation tags that there is not enough room to display. An example of this is shown in FIG. 6. Here Ellipsis (2 . . . ) 600 is used to show the user that additional animation effects exist when there is not enough space to display using the animation OOUI. This prevents the animation OOUI from overlapping with other animation tags or elements in the presentation.

Figure 7:
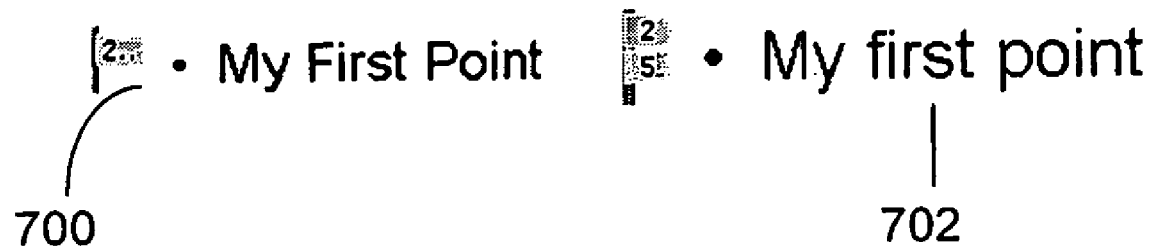
FIG. 7 is a screen image showing an exemplary implementation of the present invention wherein the size of a display is expanded to give more space to show additional animation OOUIs.

If the user expands the size of the slide in the editor then the amount of space to show the animation OOUI is recalculated. If more space is available more of the animation sequence will be shown. An example is shown in FIG. 7. As the user expands the size of the slide (and hence gives more space to show the animation OOUIs), additional animation OOUIs (2,5 . . . ) are shown.

Figure 8A:
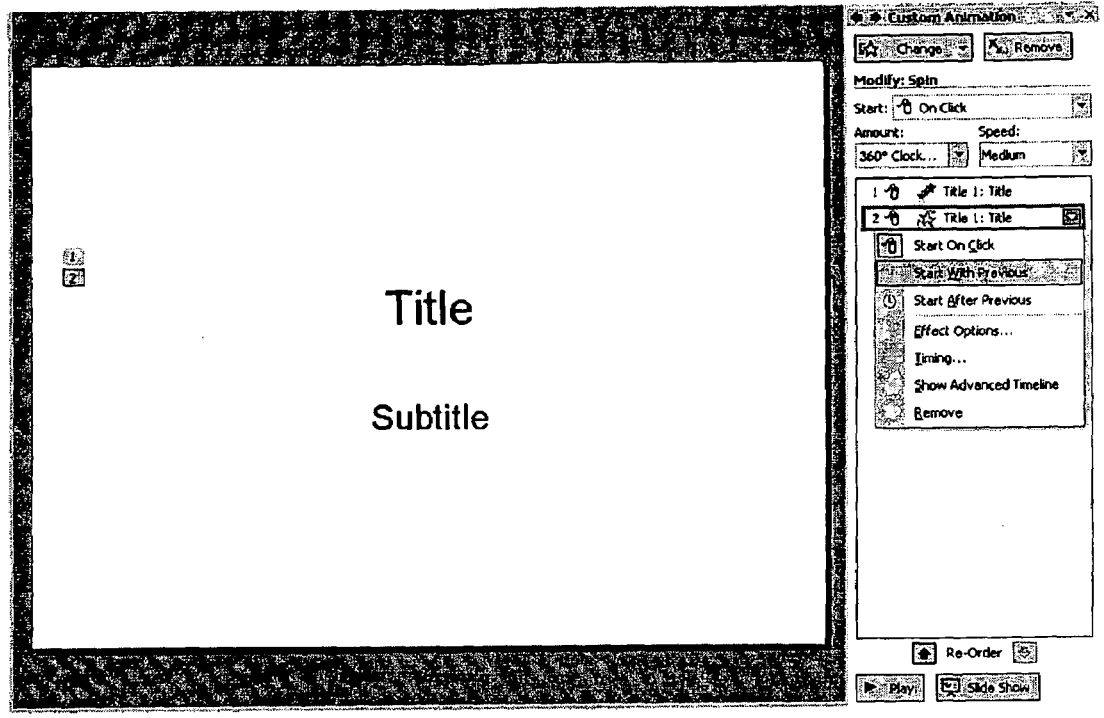
FIG. 8A is a screen image showing an exemplary implementation of the present invention wherein two animation effects are combined in the animation list.
Figure 8B:
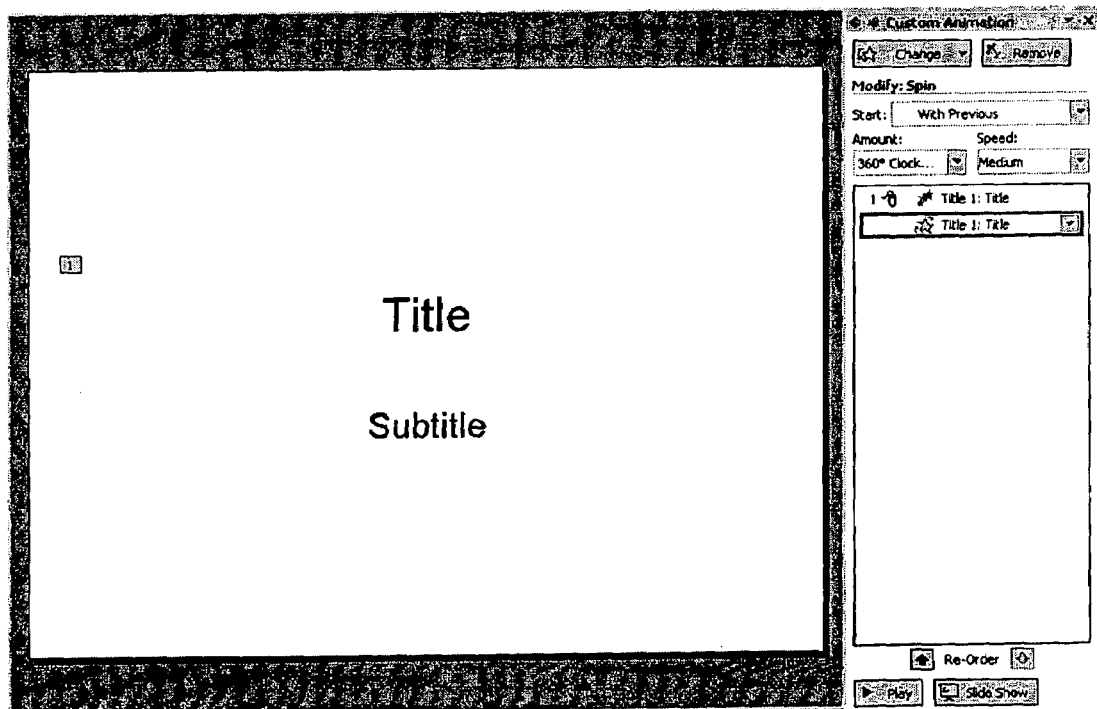
FIG. 8B is a screen image showing an exemplary implementation of the present invention wherein the OOUIs are combined after the two animation effects in the animation list in FIG. 8A are combined.

In FIGS. 8A and 8B an example of combining animation effects in the animation list is provided. In FIG. 8A an animation effect in the animation list is changed to start on the same click as the previous effect. As shown in FIG. 8A, because the effects now are both on the same element the OOUIs are combined to avoid clutter beside the 'Title' object.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Wherefore, having thus described the present invention, what is claimed is:

1. A method for viewing and controlling an animation sequence of a presentation program comprising the process actions of:
    displaying at least one animation on object user interface in close proximity and within the same window of an object to be animated indicating an animation effect sequence of said object, wherein only one animation on object user interface is displayed if multiple animation effects are associated with a single input device selection action; and
    allowing a user to manipulate the animation sequence order using said at least one animation on object user interface.

2. The method of claim 1 wherein the animation on object user interface displays a number that represents a number in a sequence of input device selection actions that cause an animation effect on that object.

3. The method of claim 2 wherein said number is appended with an ellipsis if there are more animation on object user interfaces than there is space to show at the side of the associated object being animated.

4. The method of claim 2 wherein more than one animation effect can be combined, such that said more than one animation effect will occur at the same time in said animation sequence.

5. The method of claim 2 wherein more than one animation effect occurring at the same time on said object can be separated, such that said more than one animation effect will occur at different times in said animation sequence.

6. The method of claim 1 wherein said at least one animation on object user interface is associated with an effect in a list of animation effects in animation sequence order.

7. The method of claim 6 wherein each effect in said list of animation effects represents its order in a sequence of computer input device selection actions.

8. The method of claim 7 wherein when one of said effects on said list of animation effects is deleted, a corresponding animation on object user interface associated with said object is deleted.

9. The method of claim 7 wherein when the animation order of one of said effects on said list of animation effects is changed, the corresponding animation on object user interface animation order is changed.

10. The method of claim 7 wherein said animation on object user interface displays a pop-up window when said animation on object user interface is selected.

11. The method of claim 10 wherein said pop-up window displays additional information associated with said animation on object user interface.

12. The method of claim 10 wherein said pop-up window allows the user to manipulate the animation of said object.

13. The method of claim 1 wherein multiple animation on object user interfaces are displayed if multiple animation effects are associated with multiple input device selection actions.

14. The method of claim 1 wherein said animation on object user interface controls are rendered in number order along the left vertical edge of an imaginary bounding box of said associated object.

15. The method of claim 1 wherein the number of animation on object user interfaces that will fit along the edge of an associated object to be animated is preferably determined by the height of a display area displaying and the height of said object.

16. The method of claim 15 wherein the number of animation on object user interfaces displayed is increased when the size of the display is expanded.

17. The method of claim 15 wherein the number of animation on object user interfaces displayed is decreased when the size of said display is decreased.

18. The method of claim 1 wherein more than one column of animation on object user interfaces is displayed along an object when two animation objects are displayed in the same general space in the display.

19. The method of claim 1 wherein the user can use keyboard keys to activate the animation OOUIs.

20. The method of claim 1 wherein the user can use input device selection actions to activate the animation OOUIs.

21. A computer-readable medium having computer-executable instructions for controlling and displaying the animation sequence, said computer executable instructions comprising:
   displaying at least one animation tag near an object to be animated, said animation tag indicating a sequence order of at least one animation effect on said object, wherein said at least one animation tag is associated with an effect in a list of animation effects in animation sequence order, and wherein each effect in said list of animation effects represents its order in a sequence of computer input device selection actions; and
   allowing a user to manipulate the sequence order of said at least one animation effect using said at least one animation tag.

22. The computer-readable medium of claim 21 wherein the animation tag displays an indicator that represents a number in a sequence of input device selection actions that cause an animation effect on said object.

23. The computer-readable medium of claim 22 wherein when the animation order of one of said effects on said list of animation effects is changed, the corresponding animation tag order is changed.

24. The computer-readable medium of claim 22 wherein said number is appended with an ellipsis if there are more animation tags than there is space to display at the side of the associated object being animated.

25. The computer-readable medium of claim 22 wherein the user can set the animation order by using a graphical control that allows the user to increment or decrement a value using a input device selection action associated with a pop up window given when the user selects the OOUI.

26. The computer-readable medium of claim 21 wherein said computer executable instructions further comprise at least one of:
   selecting at least one of said effects on said list of animation effects such that a corresponding animation tag associated with said object is selected;
   deselecting at least one of said effects on said list of animation effects that was previously selected such that said corresponding animation tag associated with said object is deselected.

27. The computer-readable medium of claim 21 wherein said animation tag changes so as to graphically indicate to the user that the effect has been selected when at least one of said effects on said list of animation effects is selected.

28. The computer-readable medium of claim 21 wherein when one of said effects on said list of animation effects is deleted, a corresponding animation tag associated with said object is deleted.

29. The computer-readable medium of claim 21 wherein a first object overlaps a second object and wherein a first animation tag associated with said first object is displayed in the foreground when no object is selected.

30. The computer-readable medium of claim 21 wherein several objects overlap and wherein the animation tag associated with a selected object comes to the foreground.

31. The computer-readable medium of claim 21 wherein said animation tag is visible when an animation sequence is being created and edited, and wherein said animation tag is not visible when said animation sequence is viewed by an audience.

32. A computer readable medium having computer-executable instructions for controlling and displaying the animation sequence, said computer executable instructions comprising:
   displaying at least one animation tag near an object to be animated, said animation tag indicating a sequence order of at least one animation effect on said object, wherein more than one column of animation on object user interfaces is displayed along an object when two animation objects are displayed in the same general space in the display; and
   allowing a user to manipulate the sequence order of said at least one animation effect using said at least one animation tag.

33. A system for displaying and controlling an animation sequence, the system comprising:
   a general purpose computing device; and
   a computer program comprising program modules executable by the computing device, wherein the computing device is directed by the program modules of the computer program to,
      display at least one animation tag and within the same window near an object to be animated, said animation tag indicating a sequence order of at least one animation effect on said object, wherein only one animation on object user interface is displayed if multiple animation effects are associated with a single input device selection action; and
      allow a user to manipulate the sequence order of said at least one animation effect using said at least one animation tag.

34. A computer-readable medium having computer-executable instructions for controlling and displaying an animation sequence, said computer executable instructions comprising:
   displaying at least one animation tag and within the same window near an object to be animated, said animation tag indicating a sequence order of at least one animation effect on said object wherein only one animation on object user interface is displayed if multiple animation effects are associated with a single input device selection action; and
   allowing a user to manipulate the sequence order of said at least one animation effect using said at least one animation tag, wherein the user can use keyboard keys to activate the at least one animation tag.

35. A computer-readable medium having computer-executable instructions for controlling and displaying the an animation sequence, said computer executable instructions comprising:

displaying at least one animation tag near and within the same window as an object to be animated, said animation tag indicating a sequence order of at east one animation effect on said object, wherein only one animation on object user interface is displayed if multiple animation effects are associated with a single input device selection action; and allowing a user to manipulate the sequence order of said at least one animation effect using said at least one animation tag, wherein the user can use input device selection actions to activate the at least one animation tag.

\* \* \* \* \*